United States Patent [19]

Mennenga

[11] 4,083,231

[45] Apr. 11, 1978

[54] SELF-CALIBRATING LEAK DETECTOR CIRCUIT ARRANGEMENT

[75] Inventor: Hermann Mennenga, Balzers, Liechtenstein

[73] Assignee: Balzers Patent-und Beteiligungs-Aktiengesellschaft, Liechtenstein

[21] Appl. No.: 690,920

[22] Filed: May 28, 1976

[30] Foreign Application Priority Data

Jun. 18, 1975 Switzerland .................. 007950/75

[51] Int. Cl.² .................. G01M 3/16; H01H 47/02
[52] U.S. Cl. .................. 73/40.7; 73/23.1; 307/97; 307/152
[58] Field of Search .................. 73/23.1, 40.5 R, 40.7; 307/152, 97, 132 EA; 328/175; 340/237 R, 242, 316

[56] References Cited

U.S. PATENT DOCUMENTS

| | | | |
|---|---|---|---|
| 3,247,703 | 4/1966 | Burk | 73/23.1 |
| 3,252,101 | 5/1966 | Gorbatenkø | 307/152 X |
| 3,475,600 | 10/1969 | Spence | 73/23.1 X |
| 3,585,845 | 6/1971 | Cornell et al. | 73/40.7 |
| 3,698,237 | 10/1972 | Rhodes, Jr. | 73/23.1 |
| 3,786,675 | 1/1974 | Delatorre et al. | 340/242 X |

*Primary Examiner*—Richard C. Queisser
*Assistant Examiner*—John S. Appleman
*Attorney, Agent, or Firm*—McGlew and Tuttle

[57] ABSTRACT

The self-calibrating leak detector circuit arrangement comprises a measuring probe for generating an electrical signal when exposed to the leaking gas. A measuring amplifier is connected to the probe for amplifying the electrical signal and a second integrating amplifier stage is connected to the measuring amplifier output for amplifying the signal. The second amplifier stage has a feedback connection to the input of the measuring amplifier for counteracting at least a part of the electrical signal from the probe. A push button switch is advantageously connected between the measuring amplifier and the second amplifier stage to momentarily impress the output of the measuring amplifier on the input of the second integrating amplifier stage. Indicators are connected to the outputs of the respective amplifiers for a reading of their respective outputs.

2 Claims, 8 Drawing Figures

SELF-CALIBRATING LEAK DETECTOR CIRCUIT ARRANGEMENT

FIELD AND BACKGROUND OF THE INVENTION

This invention relates in general to the construction of gas leak detectors and, in particular, to a new and useful leak detector circuit arrangement which utilizes an electrical signal from a leak-sensing probe to recalibrate itself each time a push button switch is closed and as the probe is moved over a surface to be scanned for leaks.

DESCRIPTION OF THE PRIOR ART

Known devices for measuring leaks include measuring probes which are based, for example, on one or more of the following:

1. the ionizing cross-section of the type of gas employed;
2. on the different conductivities of the gases;
3. on the generation of positive ions on a heated anode under the impact of a test gas; and
4. on the dependence of the electrical resistance of semiconductors on the surrounding gas atmosphere.

In addition, the mass spectrometer has also been used at times as a test gas detector in the location of leaks. Other less frequently used probes are based on the finding of ultrasonic waves in the frequency range of from between 35 and 40 kHz for the detection of leaks, on the catalytic combustion of a combustible gas which passes through a leak on a hot platinum wire, on the detection of the radioactivity of the test gas passing through a leak, or on nuclear reactions themselves.

All measuring probes supply a final current or voltage signal which is fed to an amplifier. All leak detectors, furthermore, have an optical or acoustical indicator to indicate the size of the leak. In its simplest form, the indicator can be designed as a signal lamp or a signal tone generator. Substantially all common circuits additionally have a zero balance to compensate the base signal of the probe which is also present if no test gas impinges on the probe. This base signal consists, for example in an ionization manometer which is employed as a probe, of the basic ionic current which originates from the residual gas atmosphere without the test gas. In probes which respond to the thermal conductivity of the surrounding gas, the thermal conductivity of the residual gas, which is free of the test gas, produces a corresponding base signal. In particular, the widely used halogen detector diodes have such a base signal which is based on the residual ion emission of the glowing anode which also exists if there is no halogen present.

More annoying than the base signal itself is the fact that it is not constant, but shows slow and rather large fluctuations in time, so that the detection and localization, particularly of small leaks, is very difficult. Differential circuits have already been suggested so that only the rate of change of the signal speed is indicated. The slowly varying base signal is suppressed, but the exact location of the leaks, and particularly, the detection of small leaks, is still difficult since when the suspected area is slowly scanned in order to be able to determine the exact location, the rate of change of the signal speed is very low. If the probe is retained for a somewhat longer time in the area to determine more accurately the exact location during the scanning with the test gas spray gun or a so-called sniffer, the rate of change of the signal speed may drop to zero. The determination of the site of the leak and the information regarding the size of the leak thus becomes very unreliable. It would be possible to perform faster movements with the probe over the suspected area to increase the rate of change of the signal speed, but it was found that the air turbulences caused by the movement in most probes, particularly in the widely used halogen detector diodes, produces interference signals so that the leak can be simulated and the exact localization and measurement become impossible.

In order to be able to detect even small leaks, despite the unavoidable fluctuations of the base signal, which can be greater by a large mutliple than the measuring signal, it has been tried heretofore, by constantly resetting the zero balance, to compensate the respective signal again and again, so that only the instantaneous change is indicated, similar to the differentiation method. This method has the advantage over the differentiation method in that the variations can be measured with great sensitivity and the measuring signal does not depend on the size of the rate of change of the signal speed. The constant balancing is cumbersome, however, and requires great skill, as otherwise the reading will easily move out of the measuring range of the indicating instrument, particularly in the case of great amplification, and this can damage the instrument by overload. In order to avoid this, different sensitivity stages are always provided in the known instruments. However, it was not possible to compensate more than four to five times the full deflection of the indicating instruments when the instrument was set to maximum detection sensitivity.

In a known arrangement for detecting leaks in closed containers or cans, the container to be tested is placed in a vacuum test chamber. If a test gas escapes from the test objects into the test chamber due to leaks, a first measuring signal appears at one probe. When the test gas pressure has risen in the test chamber after a certain time, the pressure gas is measured a second time and the result is compared with the stored signal and it is determined whether the difference has exceeded an admissible limiting value. In this way, it is possible to distinguish between untight and sufficiently tight containers. The application of this method is naturally limited to cases where the object to be tested can be placed in a test chamber which does not apply to the detection of leaks in high-vacuum plants.

SUMMARY OF THE INVENTION

The present invention provides a circuit arrangement which operates faster and easier than the known constructions and which permits greater accuracy in detecting a leak. The circuit arrangement according to the invention is characterized in that:

a. a known control circuit is provided to generate a reverse voltage in order to at least partly compensate the measuring signal at the input of measuring amplifier;

b. push button switch is arranged between the output of the measuring amplifier and the input of the variable gain amplifier; and c. a storage unit is provided for storing the compensating voltage generated by the control circuit, which is connected to the input of the measuring amplifier.

The use of such a control circuit in connection with a push button switch, as an operating element, and a storage unit has the effect that, when a suspected area is scanned with the probe, the signal generated in a measuring site can be immediately compensated at any time. It is therefore possible to determine exactly a slight variation when approaching the exact location of a leak and to utilize the full amplifier sensitivity. Such an arrangement overcomes the disadvantage of zero balancing which is subject to a change of a base signal during the required operating time so that the resulting reading could therefore not be clearly interpreted as a true change of the measuring signal. Thus with the invention, it is possible to determine the exact location of the leak without repeated scanning as required by the zero balancing system. The use of a storage unit has the advantage that it is no longer necessary to keep the probe at the site to determine the size of the leak and this will substantially facilitate the operation. The size of the leak can now be determined from the size of the last stored compensating voltage even if the probe has been moved in the meantime out of the range of the leak.

Accordingly, it is an object of the invention to provide an improved circuit arrangement for a leak detector having a probe for generating an electrical measuring signal proportional to the magnitude of the leakage gas which includes a measuring amlifier connected to the probe and advantageously having an indicating instrument for indicating the size of the leak and which also includes a variable gain amplifier control circuit connected to the first amplifier for generating a reverse voltage in an amount to at least partly compensate the measuring signal at the input of the measuring amplifier and which advantageously includes a push button switch connected between the measuring amplifier and the variable gain amplifier control circuit and wherein the control circuit includes a storage unit which is connected to the measuring amplifier.

A further object of the invention is to provide a method of ensuring the proper operation of a leakage detector measuring probe using a first stage amplifier and an indicating instrument for indicating the reading of the measuring probe and a second stage amplifier circuit which comprises periodically and instantly connecting the amplifier to a second stage amplifier control circuit and delivering a reverse voltage in an amount to at least partly compensate for the measuring signal at the measuring amplifier and wherein the reverse voltage is advantageously stored in a stored unit of the second amplifier control circuit.

Another object of the invention is to provide a self-calibrating leak detector circuit arrangement, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there are illustrated preferred embodiments of the invention.

DESCRIPTION OF THE PREFERRED EMBODIMENTS

Figure 1:
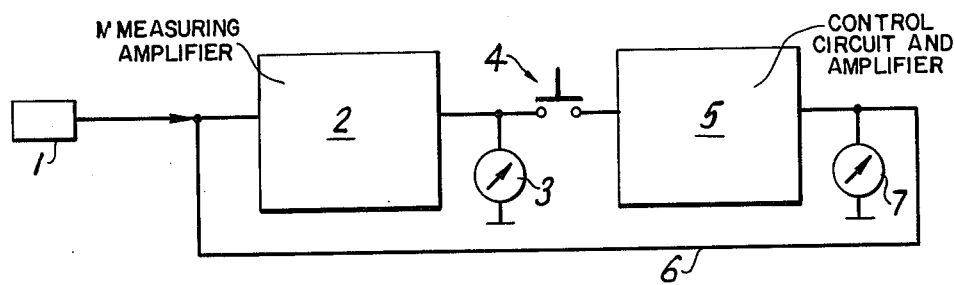
FIG. 1 is a diagrammatic view of a leakage detecting device for indicating the size of the leak constructed in accordance with the invention.

Referring to the drawings in particular, the invention embodied therein, comprises a leakage detection device or arrangement which includes a measuring probe 1 which is electrically connected to an amplifier 2 in an arrangement such that the probe supplies a leak-dependent electrical signal to the input of the measuring amplifier 2 during operation. Amplifier 2 has a low ohmic output which is connected to an instrument 3 for indicating the amplified signal. The output of the measuring amplifier is also connected to a push button switch 4 which in turn is connected to a second stage amplifier circuit or control circuit 5. Control circuit 5 contains a final control element which is so designed that the input signal of the measuring amplifier is at least partly compensated by the generation of a reverse voltage which is transmitted through a return line 6 to the probe 1 whenever push button switch 4 is engaged. This compensating reverse voltage is maintained for any desired time after the push button switch has been opened. This return voltage can be read by an instrument 7 at the output of the control amplifier circuit 5.

Figure 2:
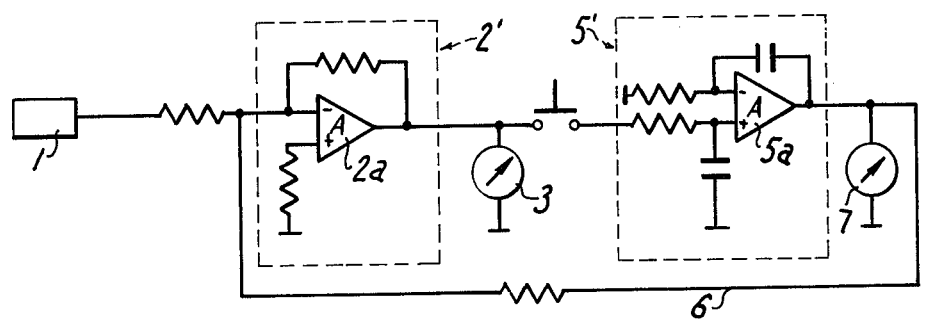
FIGS. 2, 3 and 4 are views, similar to FIG. 1, of other embodiments of the invention.
Figure 3:
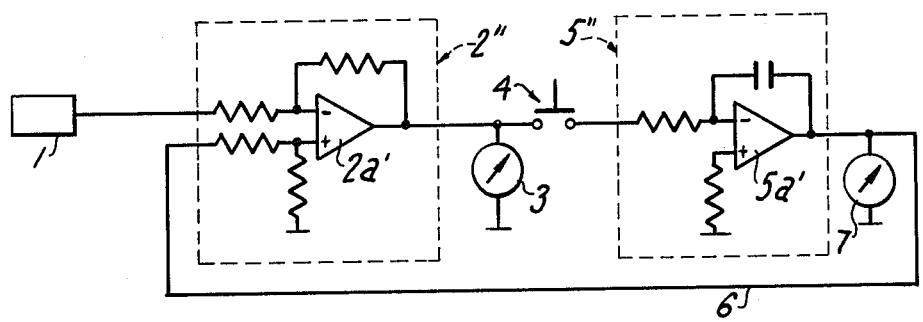

FIGS. 2 and 3 show embodiments of suitable circuit arrangements. The measuring stage amplifier 2' includes a known amplifier circuit 2a or 2a' as shown in FIGS. 2 and 3, respectively. The second stage amplifier or control amplifier arrangement, as indicated at 5' and 5", respectively, in FIGS. 2 and 3, are as indicated in FIGS. 2 and 3 at 5a and 5a', respectively. The control stages 5' and 5" are advantageously built of elements which produce an integrating behavior, such as a Miller integrator, bootstrap circuit.

Figure 4:
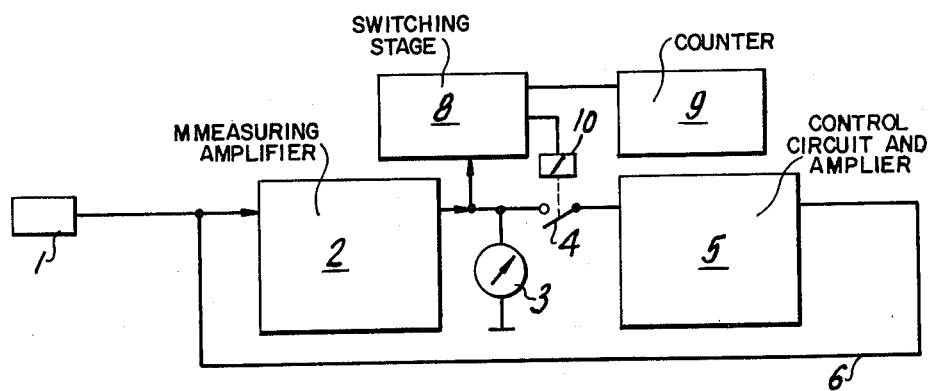

The embodiment shown in FIG. 4 is similar to that shown in FIG. 1, but also includes a switching stage 8 which comprises a so-called Schmitt trigger, which is connected to the push button switch 4 and actuates switch 4 over a relay 10. The number of closings of the switch 4 is recorded in a counting stage by a counter 9 and it is a measure of the size of the leak to be found. The reading of the instrument 3 has only the character of a tendency reading. The arrangement of FIG. 4 preferably is used when the signal of the measuring probe has a linear relation to the size of the leak over a wide range. The output signal of measuring amplifier 2 triggers, with full modulation, the switching stage 8.

Figure 5:
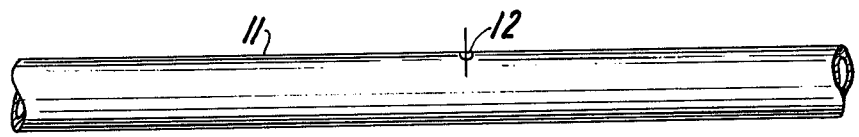
FIG. 5 is a side elevational view of a pipe through which a gas is conducted which is to be tested for leakage.

In FIG. 5, there is indicated a leaky pipe section 11 which is, for example, under a test gas over-pressure and which is being scanned with a scanning probe, such as a sniffer gun, which is of a known construction, for a leak 12.

Figure 6:
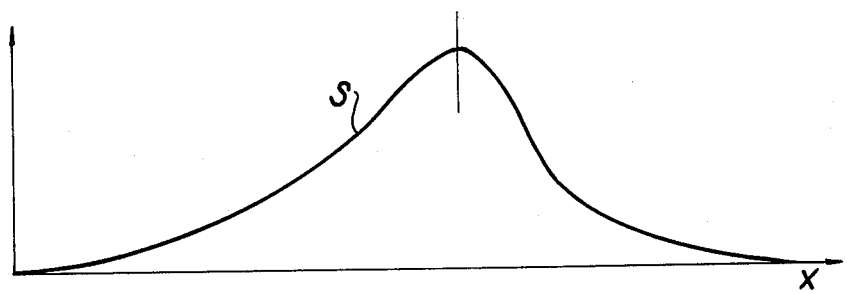
FIGS. 6, 7 and 8 are curves indicating the variations of the signal at the output of the measuring amplifier stage 2.
Figure 7:
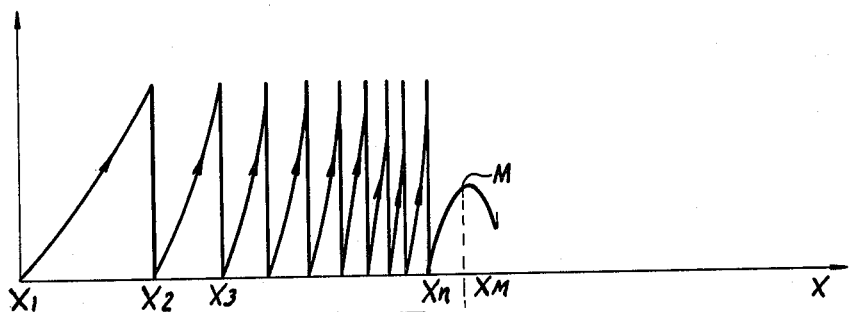
Figure 8:
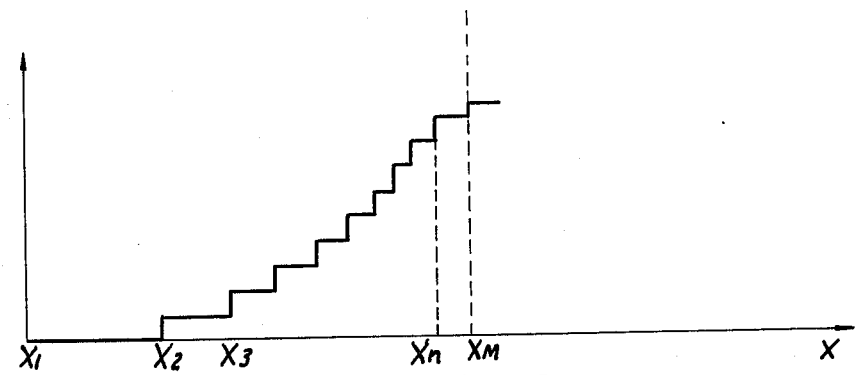

FIG. 6 shows a signal course S in dependence on the scanning path $x$. FIG. 7 shows a corresponding signal course at the output of the measuring stage amplifier 2. At the points $x_1$ to $x_n$, the push button switch is pressed down briefly after a full modulation of the measuring amplifier. After the point $x_n$, no full modulation is achieved any more in this example, but rather a maximum M appears at $x_M$. This means that $x_n$ is closest to the site of the leak. The leakage area can thus be exactly outlined, and the respective compensating voltage can be read on the instrument 7. This compensating voltage is shown only in FIG. 8, and it rises from the $x_o$ to $x_M$ in steps, as shown in FIG. 8.

An essential feature of the invention is that the indicating sensitivity can be kept constant over a wide dynamic range. Thus, for example, a dynamic range of 3 decimal powers with a constant sensitivity reading can be realized with the circuit shown in FIG. 2, while only one decimal power is achieved in the known circuits. The push button switch 4 is preferably arranged on the scanning element which comprises a sniffer or spray gun so that the testing person can concentrate fully on the localization of the leak. Another advantage is that the size of the leak remains indicated after the last pressure on the push button. Furthermore, the circuit arrangements, permit in a simple manner, a comparison of the size of the two leaks, where one size can be known, that is, the test leak.

While specific embodiments of the invention have been shown and described in detail to illustrate the application of the principles of the invention, it will be understood that the invention may be embodied otherwise without departing from such principles.

What is claimed is:

1. A self-calibrating leak detector circuit arrangement, comprising a measuring probe for generating an electrical measuring signal when exposed to a leakage gas, a measuring amplifier connected to said probe, an indicating instrument connected to said measuring amplifier for indicating the size of the leak, a variable gain amplifier control circuit connected to said amplifier for generating a reverse voltage in an amount to at least partly compensate the measuring signal at the measuring amplifier, a scanning element connected to said amplifier control current, a push button switch connected between the measuring amplifier and said variable gain amplifier control circuit, said control circuit including a storage unit, for storing said reverse voltage, which is connected to said measuring amplifier, a switching stage connected to said switch button and said amplifier for automatically operating said push button when a predetermined size of the signal has been reached on the measuring amplifier, and a counter connected to said push button for recording the number of closings of said push button.

2. A method of operating a leak detector, comprising a measuring probe which is connected to an amplifier for amplifying the measuring signal, comprising generating a reverse voltage in a separate amplifier control circuit and storing the reverse voltage therein, periodically connecting the stored reverse voltage to the measuring amplifier through a reversing switch for counteracting at least a part of the electrical signal from the probe, sensing the probe signal and periodically closing the switch between the stored reversing voltage and the probe in response to the sensing and counting the number of times the switch is opened and closed.

* * * * *